Patented July 4, 1950

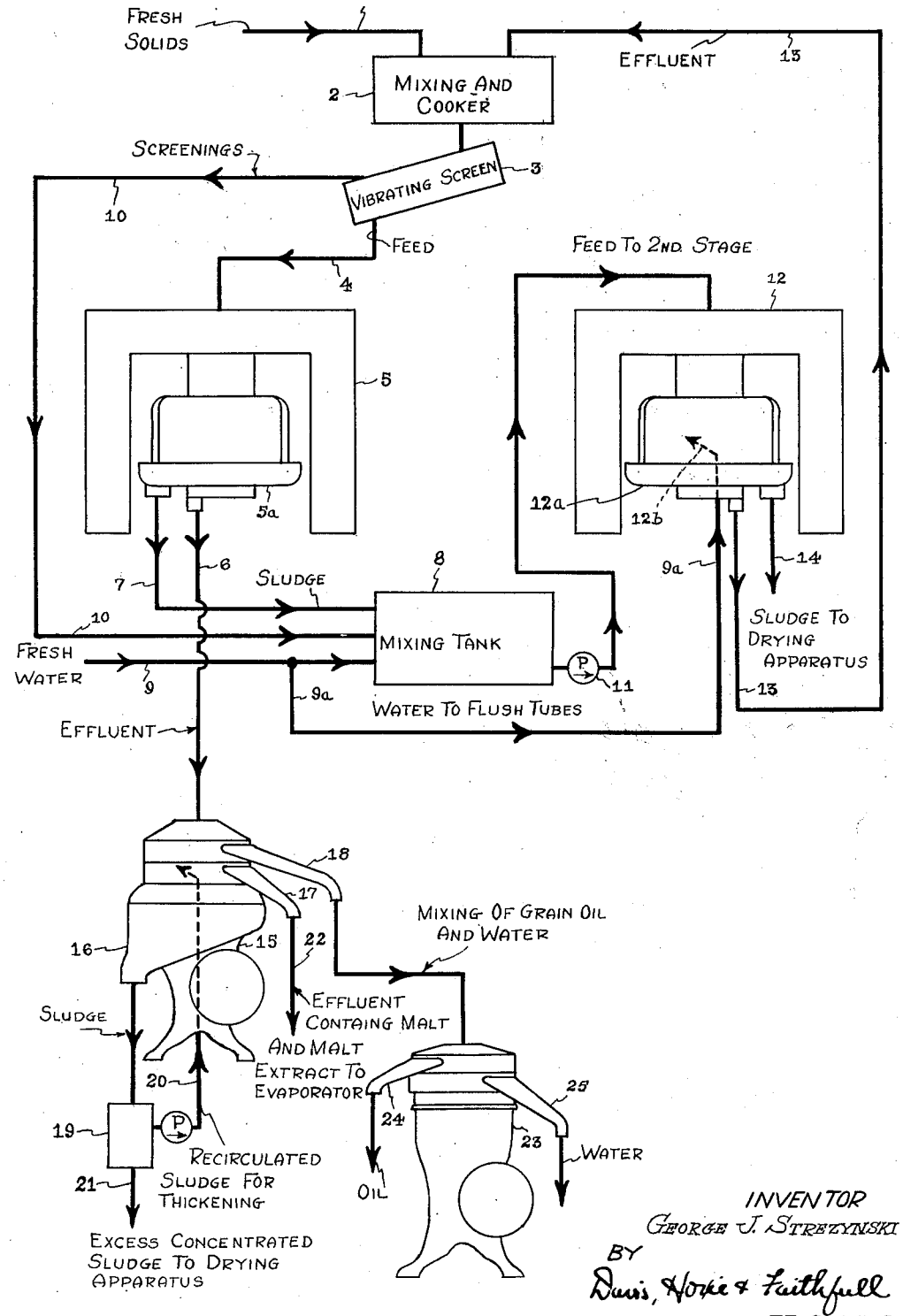

2,513,687

UNITED STATES PATENT OFFICE 2,513,687

PRODUCTION OF MALT EXTRACT

George J. Strezynski, Poughkeepsie, N. Y., assignor to The De Laval Separator Company, New York, N. Y., a corporation of New Jersey Application August 14, 1947, Serial No. 768,531

4 Claims. (Cl. 99—51)

This invention relates to the production of malt extract from a mash of grain and malt. More particularly, the invention has reference to an improved process and apparatus for this purpose which make use of centrifugal force in a novel manner to simplify the operations and yet render them more effective, as compared with prior processes for producing malt extract.

In conventional processes for the production of malt extract, a mash comprising a mixture of ground corn and malt is prepared by mixing and cooking. The mash is then filtered, commonly in a three-stage operation. That is, the mash is fed to a first-stage filter from which the filter cake is delivered to a tank and there mixed with the effluent from the third filter stage. The product of this mixing tank is then fed to the second filter stage, from which the filter cake is delivered to a second tank and mixed with water, the product of the second mixing tank being then fed to the third filter stage. The effluents from the first two filter stages are then dehydrated to obtain the malt extract in the desired condition.

One feature of the present invention resides in an improved process and apparatus for producing malt extract, in which the effluent containing the extracted malt is obtained by a two-stage, counterflow, centrifugal process, thereby simplifying conventional procedures for this purpose and increasing the malt yield.

Another feature is a process and apparatus of the character described, in which the malt-containing effluent from the two-stage centrifugal process is treated centrifugally to obtain grain oil from the effluent and improve the quality of the malt.

An additional feature is an improved process and apparatus for producing malt extract, in which purified and concentrated malt and a substantial quantity of grain oil may be obtained as separate constituents in a three-stage centrifugal treatment of the mash.

According to the invention, the mash of grain and malt is fed into a centrifuge, preferably after subjecting the mash to a screening operation. The centrifuge separates the mash into sludge and effluent as heavier and lighter constituents, respectively, the effluent containing most of the malt, and discharges these constituents in separate streams. The sludge constituent is then fed to a mixing tank where it is mixed and diluted with water and also, preferably, with the screenings from the operation preceding the centrifuging. This dilute mixture of sludge and screenings is fed to a second centrifuge which separates it into sludge and effluent constituents and discharges the constituents in separate streams. The effluent discharge from the second centrifuge is then passed through the first centrifuge along with the mash, so that its contained malt joins the effluent discharge from the first centrifuge, the latter discharge being subsequenly concentrated to obtain the malt extract in the desired condition. Preferably, the second-stage effluent is mixed with the mash before the latter is subjected to the screening operation, as by feeding this effluent to the zone in which the ground grain and malt are mixed and cooked before they are screened.

In order to recover grain oil from the malt-containing effluent after centrifuging the mash, preferably in the two-stage treatment described, the effluent is fed to another centrifuge which separates the effluent into three constituents, namely, sludge, effluent, and a mixture of grain oil and water. Part of the sludge discharge from the last centrifuge may be recycled to the peripheral portion of the last separating chamber to thicken the sludge discharge. The mixture of grain oil and water from the last centrifuge is then subjected to a separating operation, as in a centrifugal oil purifier, to separate the grain oil from the water. The effluent discharged from the three-way separating operation contains substantially all of the malt in a concentrated and purified form, and this effluent may be dehydrated to obtain the desired consistency of the extract.

For a better understanding of the invention, reference may be had to the accompanying drawing, in which the single figure is a schematic view of a preferred form of the new apparatus.

Referring to the drawing, the fresh solids comprising a mixture of corn mash and malt are fed through a pipe line 1 into a vessel 2 where they are mixed and cooked. From the vessel 2, the mixture is passed through a vibrating screen 3 to remove the coarser solids, and then through a pipe 4 to a centrifugal separator 5 having a suspended separating bowl in a stationary housing 5ª. In the separating bowl which is preferably of the type disclosed in U. S. Patent No. 2,291,117, issued to G. J. Strezynski on July 28, 1942, the screened mixture is centrifugally separated into an inner annulus or effluent containing most of the malt, and an outer annulus comprising mainly sludge. The effluent is discharged from the central part of the bowl into outlet pipe 6 leading from the centrifuge housing, while the sludge is discharged through nozzles in the outer periphery of the bowl into pipe 7 leading from the housing.

The sludge from the centrifuge is delivered through pipe 7 to a mixing tank 8, where the sludge is diluted and mixed with fresh water introduced into the tank through a pipe 9. In the tank 8, the sludge discharge is preferably mixed not only with the fresh water but also with the screenings from screen 3, which are delivered to tank 8 through a pipe 10. After the diluted sludge and screenings have been thoroughly mixed in tank 8, the mixture is delivered by a pump 11 to a second stage centrifuge 12 similar to the centrifuge 5. The housing 12a of the second centrifuge contains a centrifugal bowl which effects a two-way separation of the mixture into an inner annulus of effluent containing most of the remaining malt, and an outer annulus of sludge. The effluent and sludge constituents are separately discharged from the bowl and its housing 12a into pipes 13 and 14, respectively, the sludge from pipe 14 being delivered to a suitable drying apparatus (not shown) for recovering the solids. Preferably, the sludge is flushed through the peripheral nozzles in the bowl by means of water fed through pipe 9a to flush tubes 12b leading to the nozzle entrances. The water introduced through tubes 12b not only flushes the sludge from the centrifugal separating chamber but also acts to displace malt-containing effluent from the sludge, the displaced effluent moving inwardly to join the discharge through pipe 13.

The effluent from the second stage centrifuge 12 is returned by pipe 13 to the mixing and cooking vessel 2, to be combined with the fresh solids fed to this vessel from pipe 1. Accordingly, the remaining malt in the effluent from pipe 13, combined with the fresh solids, is again subjected to the mixing and cooking operation and to the screening action and then re-centrifuged in the separator 5, from which it discharges through pipe 6 with the effluent separated from the fresh solids.

The effluent from pipe 6 is delivered to a third centrifuge 15 where a three-way centrifugal separation is effected. That is, the effluent is centrifugally separated into an outer annulus comprising mainly sludge, an intermediate annulus of clarified effluent containing most of the malt, and an inner annulus comprising a mixture of corn oil and water, the constituents forming these annuli being separately discharged through outlets 16, 17 and 18, respectively. The sludge from outlet 16 is delivered to a seal cup or a container 19 from which part of the sludge is returned through pipe 20 to the peripheral portion of the separating chamber in centrifuge 15. As a result, this recycled sludge will discharge with the initially separated sludge through the peripheral outlets in the separating chamber, and a more concentrated sludge can be obtained from outlet 16. By varying the recycling rate through pipe 20, the concentration of the sludge discharged from outlet 16 may be controlled. The part of the sludge which is not recycled to centrifuge 15 is removed from the system through pipe 21 leading from seal cup or container 19. The pipe 21 may convey the sludge to the drying apparatus previously mentioned for treating the sludge discharge from centrifuge 12. The clarified effluent discharged from the outlet 17, which contains substantially all of the malt extract in a purified form, may be delivered to an evaporator (not shown) for further concentration.

The mixture of corn oil and water from outlet 18 flows to a fourth centrifuge 23 in the form of an oil purifier, where the mixture is centrifugally separated into an inner annulus of oil and an outer annulus of water, the two constituents from these annuli being discharged separately through outlets 24 and 25, respectively. The water discharged from outlet 25 may be returned to a previous point in the system, such as the mixing tank 8 or the flush pipe 9a, or it may be dehydrated along with the effluent from pipe 22, to recover the contained malt. The corn oil from outlet 24 is a valuable by-product which may be used commercially for various purposes.

By the use of the present invention, the usual mash of corn and malt may be treated in a continuous operation to obtain a high yield of the malt extract. In addition, the extract is obtained in a highly purified and concentrated condition, and the valuable oil is recovered as a separate by-product, which has not been possible heretofore with the conventional filtering treatment.

I claim:

1. In the production of a malt extract from a mash of grain and malt, the process which comprises subjecting the mash to a screening operation, then feeding the mash into a locus of centrifugal force and there separating it into sludge and effluent as heavier and lighter constituents, respectively, the effluent containing most of the malt, separately discharging said constituents from the locus, mixing and diluting the screenings from said operation with the sludge discharge from said locus, feeding said sludge and screenings to a second locus of centrifugal force and there separating them into sludge and effluent as heavier and lighter constituents, respectively, said last effluent containing most of the remaining malt in said first sludge discharge, separately discharging said last constituents from the second locus, and mixing malt-containing effluent from the second locus with the mash before the mash is subjected to said screening operation, whereby malt in said last effluent discharge joins said first effluent discharge.

2. In the production of a malt extract from a mash of grain and malt, the process which comprises feeding the mash into a locus of centrifugal force and there separating it into sludge and effluent as heavier and lighter constituents, respectively, the effluent containing most of the malt, separately discharging said constituents from the locus, diluting the sludge discharge, feeding said diluted sludge to a second locus of centrifugal force and there separating it into sludge and effluent as heavier and lighter constituents, respectively, said last effluent containing most of the remaining malt in said first sludge discharge, separately discharging said last constituents from the second locus, feeding the effluent discharge from said second locus through the first locus, along with the mash, whereby malt in said last effluent discharge joins said first effluent discharge, and feeding a flushing liquid to the peripheral portion of said second locus to flush the separated sludge constituent therefrom and displace malt-containing effluent from the sludge in said second locus.

3. In the production of a malt extract from a mash of grain and malt, the process which comprises feeding the mash into a locus of centrifugal force and there separating it into sludge and effluent as heavier and lighter constituents, respectively, the effluent containing most of the malt, separately discharging said constituents from the locus, diluting the sludge discharge, feeding said diluted sludge to a second locus of centrifugal force and there separating it into sludge and effluent as heavier and lighter constituents, respectively, said last effluent containing most of the remaining malt in said first sludge discharge, separately discharging said last constituents from the second locus, feeding the effluent discharge from said second locus through the first locus, along with the mash, whereby malt in said last effluent discharge joins said first effluent discharge, feeding the malt-containing effluent from the first locus to a third locus of centrifugal force and there separating it into three constituents, namely, sludge, effluent containing most of the malt, and a mixture of grain oil and effluent, and separately discharging said last three constituents from the third locus.

4. A process according to claim 3, comprising also the step of separating said mixture from the third locus into grain oil and water.

GEORGE J. STREZYNSKI.

REFERENCES CITED

The following references are of record in the file of this patent:

UNITED STATES PATENTS

| Number | Name | Date |
|---|---|---|
| 834,783 | Zimmer | Sept. 21, 1909 |
| 1,920,461 | Clark | Aug. 1, 1933 |
| 2,165,950 | Willkie | July 11, 1939 |
| 2,216,904 | Brown | Oct. 8, 1940 |
| 2,263,608 | Brown | Nov. 25, 1941 |
| 2,292,769 | Pattee | Aug. 11, 1942 |
| 2,391,918 | Pattee | Jan. 1, 1946 |